United States Patent [19]
Tanaka et al.

[11] Patent Number: 6,101,156
[45] Date of Patent: Aug. 8, 2000

[54] FOCUS CONTROL DEVICE TO PERFORM FOCUS CONTROL FOR A MULTI-LAYER RECORDING MEDIUM

[75] Inventors: Toshihisa Tanaka; Hiroshi Arai, both of Yokohama, Japan

[73] Assignee: Nikon Corporation, Tokyo, Japan

[21] Appl. No.: 08/979,561

[22] Filed: Nov. 26, 1997

[30] Foreign Application Priority Data

Nov. 27, 1996 [JP] Japan ................................ 8-316349

[51] Int. Cl.⁷ .................................................. G11B 7/085
[52] U.S. Cl. ..................... 369/44.28; 369/94; 369/44.29
[58] Field of Search ............................ 369/44.27, 44.28, 369/44.29, 32, 94, 112

[56] References Cited

U.S. PATENT DOCUMENTS

| | | | |
|---|---|---|---|
| 5,263,011 | 11/1993 | Maeda et al. ........................ | 369/44.27 |
| 5,696,743 | 12/1997 | Kawasaki .................................. | 369/32 |
| 5,781,516 | 7/1998 | Yamada .................................... | 369/32 |
| 5,909,422 | 6/1999 | Kamatani .................................. | 369/94 |

*Primary Examiner*—W. R. Young

[57] ABSTRACT

A focus control device to perform focus control for a multi-layer recording medium having a plurality of recording layers. The focus control device includes an illuminating device to illuminate an information recording medium having a plurality of recording layers with a converged light beam, a focusing device to set a focus position of the converged light beam in a direction perpendicular to the recording medium surface, and a tracking device to set an illumination position of the converged light beam in a radial direction on the medium. A control unit controls the focusing device and tracking device to perform a seek operation to move the illumination position of the light beam to a target track of a target recording layer. The control unit controls the focusing device and the tracking device to change from a track following control state to a movement control state in which the illumination position of the light beam is moved in the radial direction of the medium while the focus position of the light beam is moved in the direction perpendicular to the medium to move to a target recording layer and track. The control unit returns the focusing device and tracking device to a track following control state when the illumination position of the light beam is in the neighborhood of the target track of the target recording layer.

6 Claims, 12 Drawing Sheets

FIG. 2A
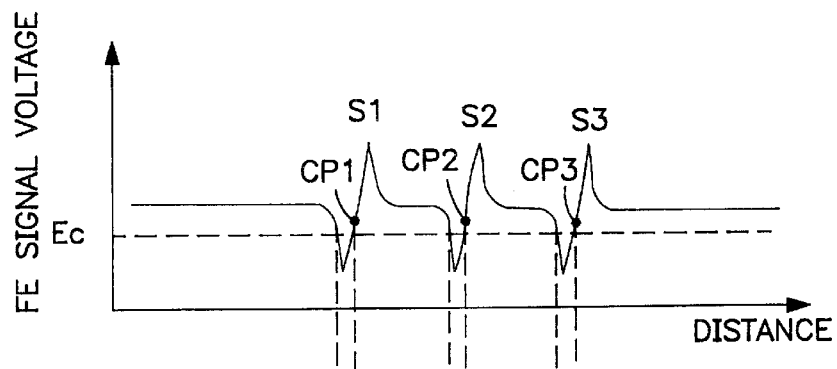
FIG. 2B
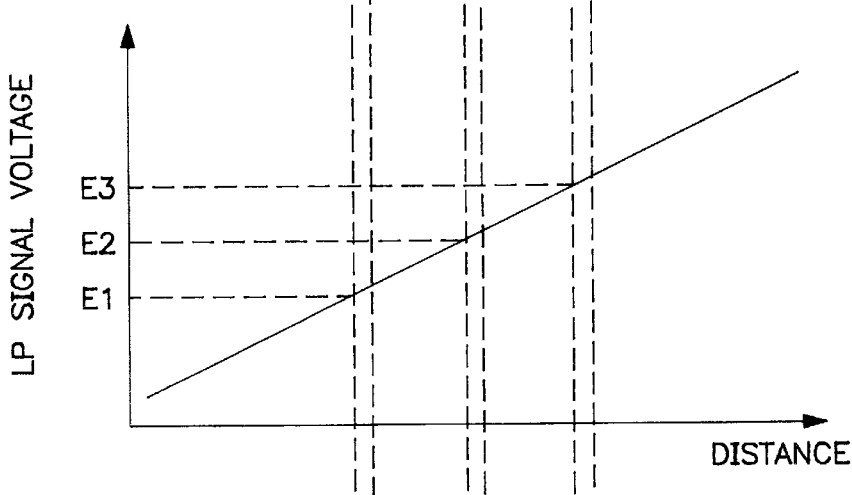
FIG. 2C
FIG. 2D
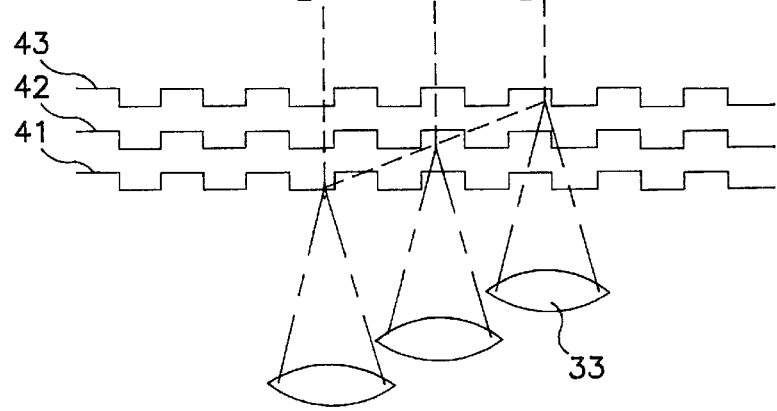

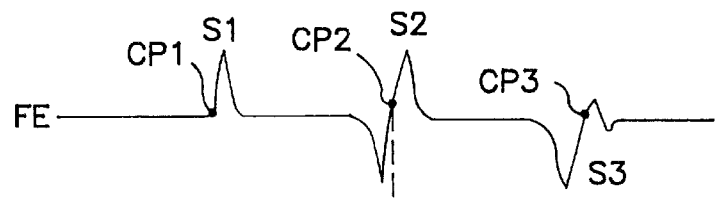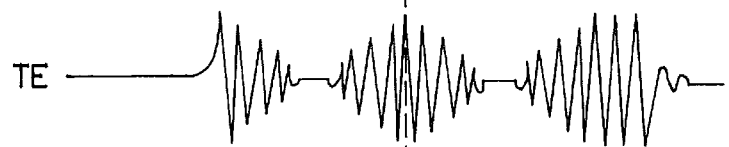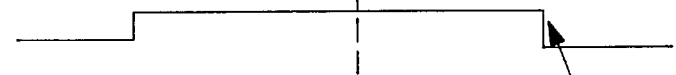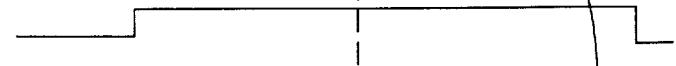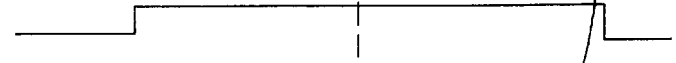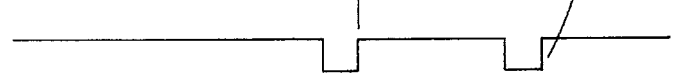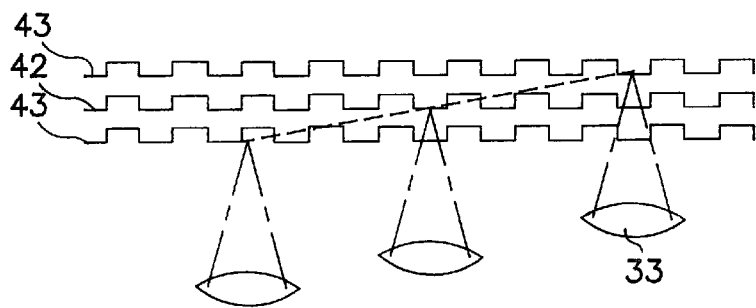

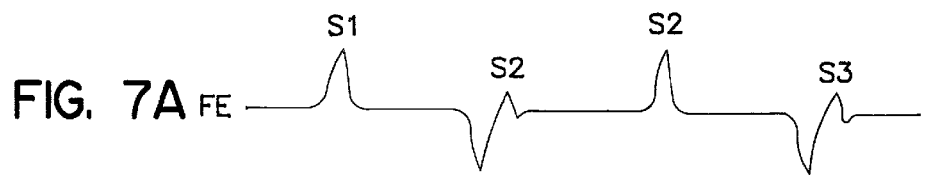
FIG. 7A FE
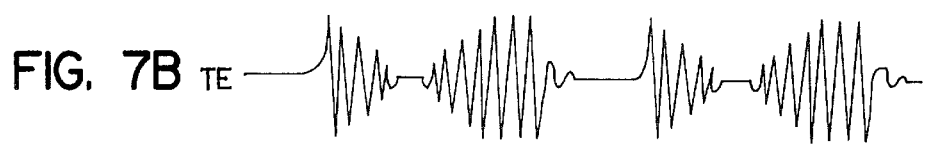
FIG. 7B TE
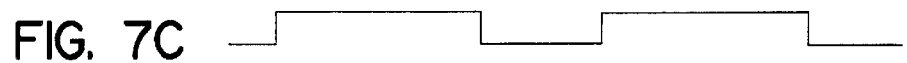
FIG. 7C
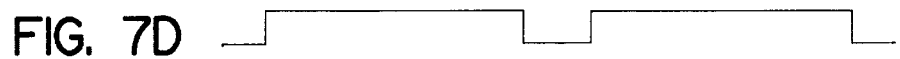
FIG. 7D
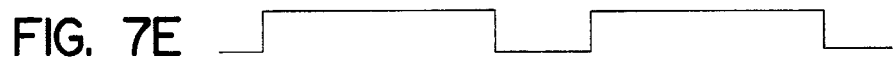
FIG. 7E
FIG. 7F
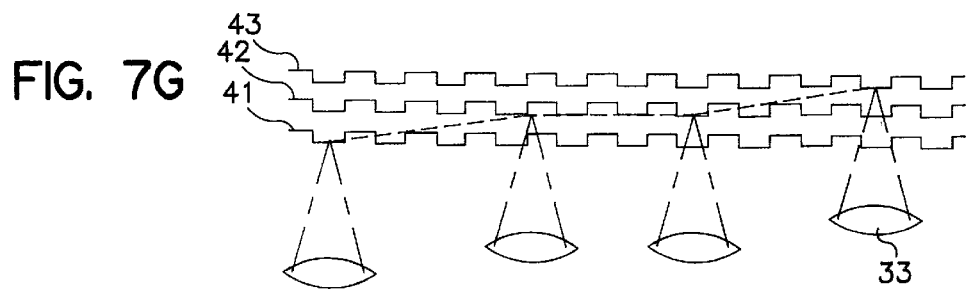
FIG. 7G

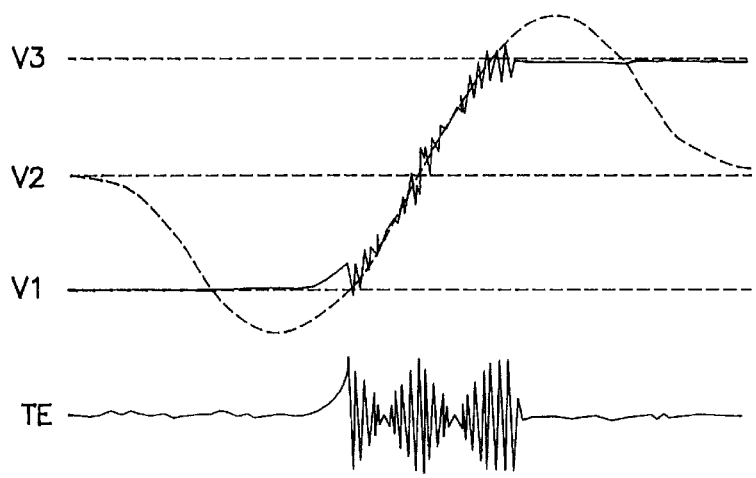
FIG. 10A
FIG. 10B
FIG. 10C
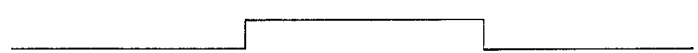
FIG. 10D
FIG. 10E
FIG. 10F
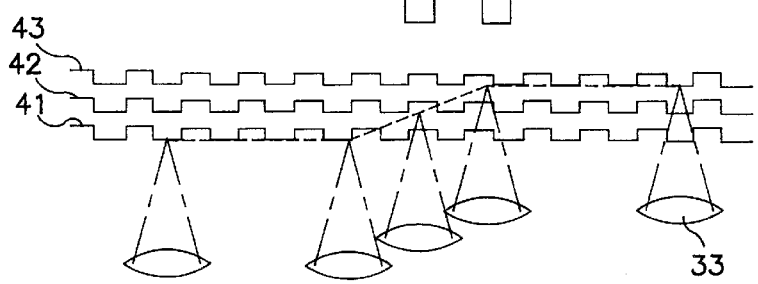
FIG. 10G

FOCUS CONTROL DEVICE TO PERFORM FOCUS CONTROL FOR A MULTI-LAYER RECORDING MEDIUM

CROSS-REFERENCE TO RELATED APPLICATIONS

This application is based upon and claims priority of Japanese Patent Application number 08-316349, filed Nov. 27, 1996, the contents of which are incorporated herein by reference.

BACKGROUND OF THE INVENTION

1. Field of the Invention

The present invention relates to a focus control device used for recording and playing back of information with respect to an information recording medium, such as magneto-optic disk, an optical disk, or the like. More particularly, the present invention relates to a focus control device to perform focus control with respect to a multi-layer recording medium having a plurality of recording layers.

2. Description of the Related Art

In recent years, various methods have been proposed to increase the storage capacity of magneto-optic disks and the like information recording media. For example, one proposed method of increasing the storage capacity of disk-type recording media is to increase the number of recording layers, thereby increasing the data density of the information recording media.

To perform recording or playback of information with respect to the known disk-type recording media, a converged light beam illuminates the surface of the recording medium. During recording or playback of information, focus control is performed to control the converged light beam such that its focus position is on the recording surface of the recording medium. However, the conventional information recording and playback devices can not perform focus control on each recording layer of a multi-layer recording medium because the conventional recording and playback devices have a recording medium with a single recording layer as the control subject.

SUMMARY OF THE INVENTION

It is an object of the present invention to solve the above-described problems of the prior art focus control device, and to provide a focus control device for accurately performing focus control on each recording layer of a multi-layer recording medium having a plurality of recording layers.

Objects and advantages of the present invention are achieved in accordance with a first embodiment of the present invention with a focus control device comprising an illuminating device to illuminate an information recording medium having a plurality of recording layers with a converged light beam; a focusing device to set a focus position of the converged light beam in a direction perpendicular to a recording medium surface; a tracking device to set an illumination position of the converged light beam in a radial direction on the recording medium; and a control unit to perform a seek operation to move the illumination position of the light beam to a target track of a target recording layer, wherein the control unit controls the focusing device and the tracking device to change from a track following control state to a movement control state in which the illumination position of the light beam is moved in the radial direction of the medium while the focus position of the light beam is moved in the direction perpendicular to the recording medium, and to return to a track following control state when the illumination position of the light beam is in the neighborhood of the target track of the target recording layer.

Objects and advantages of the present invention are achieved in accordance with a second embodiment of the present invention with a focusing control device comprising an illuminating device to illuminate an information recording medium having a plurality of recording layers with a converged light beam; a focusing device to set a focus position of the converged light beam in a direction perpendicular to the recording medium surface; a tracking device to set an illumination position of the converged light beam in a radial direction of the recording medium; and a control unit to perform a seek operation to move the illumination position of the light beam to a target track of a target recording layer, wherein the control unit controls the focusing device and the tracking device to change from a track following control state to a movement control state to move the illumination position of the light beam to a track of an adjacent recording layer, and after moving the light beam to the adjacent recording layer repeats the track following control state according to the recording layer.

Objects and advantages of the present invention are achieved in accordance with a third embodiment of the present invention with a focusing control device comprising an illuminating device to illuminate an information recording medium having a plurality of recording layers with a converged light beam; a focusing device to set a focus position of the converged light beam in a direction perpendicular to the recording medium surface; a tracking device to set an illumination position of the converged light beam in a radial direction of the recording medium; an address changeover device to change a track address of a movement destination on the recording medium to a track address on the recording layer presently being followed and having the same radial position as the track of the destination recording layer; and a control unit to change the tracking device from a track following control state to a movement control state, and to move the light beam to the track position of the track address obtained by the address changeover device, and to change the focusing device from a following control state to a movement control state, to move the focus position of the light beam to the destination position of the recording layer.

Moreover, embodiments of the present invention may further comprise a track error signal forming device to form a track error signal based on the relative displacement of the illumination position of the light beam and the track position of the recording medium in a radial direction of the medium, wherein the control unit performs speed control and position control of the tracking device based on the track error signal when moving the illumination position of the light beam to another track of the same recording layer.

Moreover, embodiments of the present invention may further comprise a position signal forming device to form a position signal based on the displacement of the tracking device in the radial direction of the recording medium, wherein the control unit performs speed control and position control of the tracking device based on the position signal, or performs speed control and position control of the tracking device based on a signal to drive the tracking device, when moving the illumination position of the light beam to another track of a different recording layer.

Furthermore, embodiments of the present invention may comprise a focus error signal forming device to form a focus error signal based on the relative displacement of the illumination position of the light beam and the recording medium surface in the radial direction of the recording medium, wherein the control unit controls the focusing device based on the focus error signal, and changes a focus offset value added to the focus error signal in the track following control state according to each recording layer.

Moreover, in accordance with embodiments of the present invention, the control unit sets the focus offset value by an initialization process during the device rise time.

Moreover, in accordance with embodiments of the present invention, the control unit changes the focus offset value at an end of an operation to move the light beam to the target position.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 2A–2D are signal waveform diagrams of a focus error signal and an objective lens focus position signal in accordance with the first embodiment of the present invention.

FIGS. 5A–5G are signal waveform diagrams describing the between-layers seek operation in accordance with the first embodiment of the present invention.

FIGS. 7A–7G are signal waveform diagrams describing a between-layers seek operation in accordance with the second embodiment of the present invention.

FIGS. 10A–10G are signal waveform diagrams describing a between-layers seek operation in accordance with embodiments of the present invention.

DESCRIPTION OF THE PREFERRED EMBODIMENTS

Figure 1:
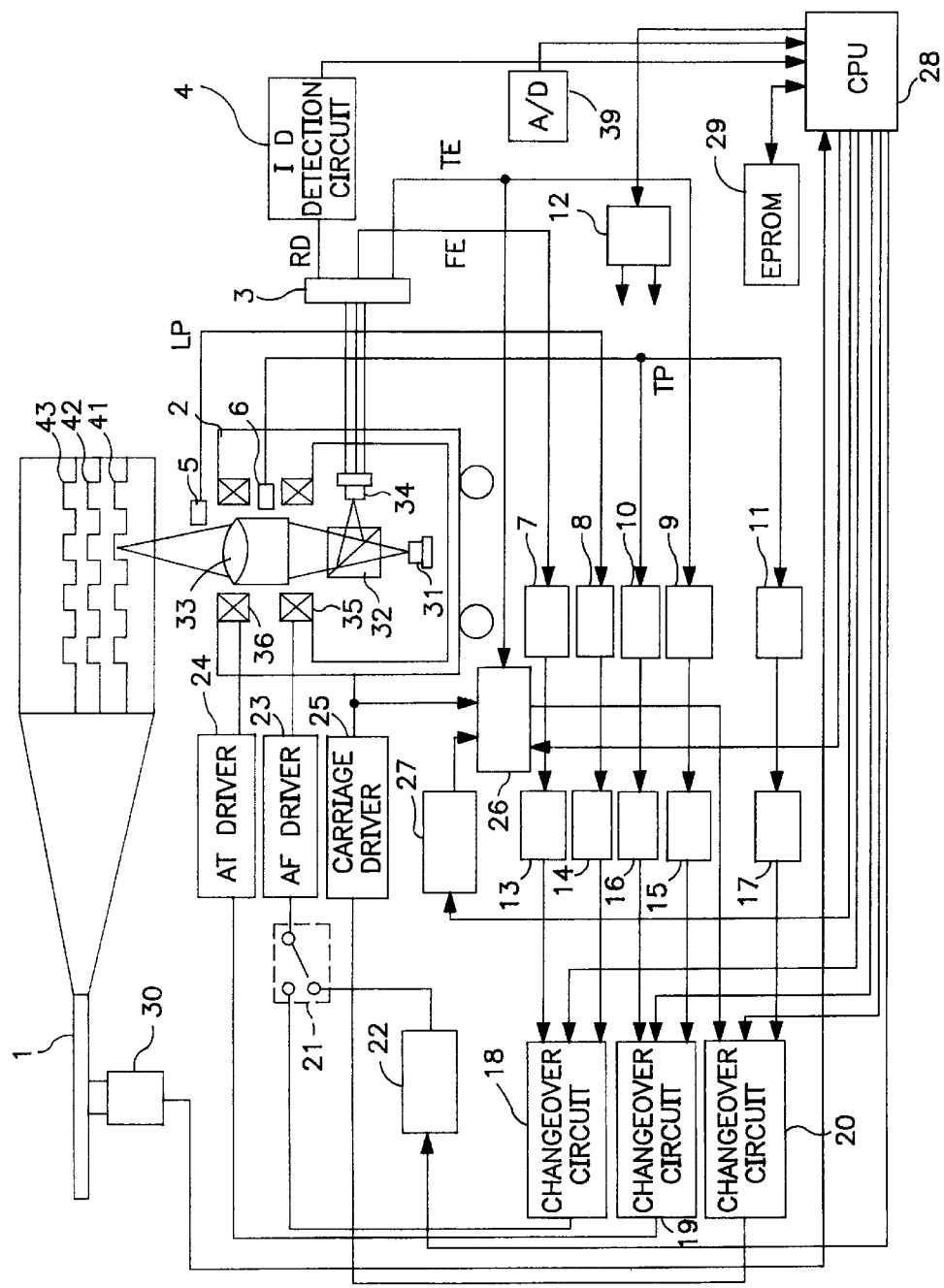
FIG. 1 is a block diagram of an information recording and playback device in accordance with a first embodiment of the present invention.

Reference will now be made in detail to the preferred embodiments of the present invention, examples of which are illustrated in the accompanying drawings, wherein like reference numerals refer to like elements throughout.

FIG. 1 is a block diagram of an information recording and playback device in accordance with a first embodiment of the present invention. As shown in FIG. 1, an optical head 2 emits a laser light beam, which is incident on an information recording medium 1 having a plurality of recording layers 41, 42 and 43. The optical head 2 is moveable in a radial direction of the information recording medium 1. The optical head 2 includes a semiconductor laser 31 to emit laser light which is incident on the recording medium 1. The laser light emitted from the semiconductor laser 31 is reflected by a beam splitter 32, passed through an objective lens 33, and then forms a laser spot on a surface of the information recording medium 1. The laser light incident on the recording medium 1 is reflected from the recording medium 1, passes through the beam splitter 32 and is incident on an optical detector 34, such as a photodetector.

The optical detector 34 is divided into a plurality of light receiving units, and the light signal received by the respective light receiving units of the optical detector 34 is output to a signal forming circuit 3. The optical detector 34 may be divided into, for example, four light receiving units.

The signal forming circuit 3 forms a focus error signal FE, a track error signal TE, a playback signal RD, and the like servo signals, based on the received light signals. The focus error signal FE indicates the relative distance between the beam waist (focus position) of the laser light converged by the objective lens 33 and the recording surface of the information recording medium 1. The distance between the objective lens 33 and the focus position is set by the objective lens 33, the outcome being that the relative distance of the objective lens 33 and the recording surface of the recording medium 1, the focus error signal FE is obtained by forming a signal indicating the difference of the distance (a predetermined distance) between the objective lens 33 and the focus position.

The tracking error signal TE indicates a difference in a radial direction of the illumination position of the laser light beam and a track position. Furthermore, the playback signal RD represents information written on the recording medium 1. The playback signal RD is obtained from a preformatted portion of the recording medium 1 or from a data portion written by the user.

The focus error signal FE has a shape referred to as an S-shaped curve. The track error signal TE has a sinusoidal waveform shape having a period corresponding to one track pitch. The track error signal TE is detected as a difference of respective received light signals of the light receiving units. In contrast, a track crossing signal is the sum of the respective received light signals, and is displaced by 90° from the track error signal TE.

An ID detection circuit 4 receives the playback signal RD and identifies an ID address written in the preformatted portion of the information recording medium 1 based on the playback signal. The layer number, track number, sector number, and the like, of a position on the recording medium 1 that the laser light spot is following are written in the ID address. The ID detection circuit 4 transmits to the CPU 28 a digital value representing the position (layer, track, sector, etc.) on the recording medium 1 being followed by the laser spot.

Furthermore, it is not necessary that the recording layer number be directly written in the preformatted portion of the recording medium during preformatting of the information recording medium 1. For example, when the track number, sector number, etc., are respectively allotted as successive numbers along each recording layer, the recording layer number can be determined even if the recording layer which the laser spot is following is identified based on the ID address and format.

The position of the objective lens 33 in a direction perpendicular to the recording medium 1 is detected by an objective lens position sensor 5. An objective lens focus position signal LP representing the position of the objective lens 33 in a direction perpendicular to the recording medium 1 is output from the position sensor 5. The objective lens focus position signal LP monotonically increases or decreases according to the position of the objective lens 33.

The objective lens focus position sensor 5 has a low sensitivity but a wide range of detection, in comparison with the range of focus error detection. The objective lens focus position signal LP output from the position sensor 5 has a control gradient corresponding to a full scale operating range of the objective lens 33 of 1–2 mm.

Moreover, the position of the objective lens 33 in the radial direction of the recording medium 1 is detected by an objective lens track position sensor 6. An objective lens track position signal TP representing the detected position of the objective lens 33 in the radial direction is output from the objective lens track position sensor 6. The signal TP also monotonically increases or decreases according to the position of the objective lens 33.

The focus error signal FE and the objective lens focus position signal LP are input to gain setting circuits 7, 8 respectively. The gain setting circuits 7, 8 perform adjustment of the gain of the respective input signals, and output an adjusted focus error signal FE and an adjusted objective lens focus position signal LP.

In order to control a focusing operation such that the laser spot illumination position follows the target recording layer of the recording medium 1, an offset impressing circuit 12 impresses an offset value on the focus error signal FE output from the gain setting circuit 7 to change the target value of control. Moreover, in order to control a seek operation between recording layers to move the laser spot to a target recording layer, the offset impressing circuit 12 impresses an offset value on the objective lens focus position signal LP output from the gain setting circuit 8 to change the target value of control.

The resolution power of the offset added to the focus error signal FE is controlled by a voltage having a step size corresponding to an amount of movement of the objective lens 33 of about 0.01 $\mu$m. Further, the resolution power of the offset added to the objective lens focus position signal LP is controlled by a voltage having a step size corresponding to an amount of movement of the objective lens 33 of about 1 $\mu$m.

The focus error signal FE and the objective lens focus position signal LP with the respective offset values impressed by the offset impressing circuit 12 are input to a seek/follow changeover circuit 18 through phase compensation circuits 13, 14. The phase compensation circuits 13, 14 are filter circuits to produce stability of the control system. The seek/follow changeover circuit 18 outputs a control signal to an AF driver 23 via a switch 21. The AF driver 23 provides drive current to a focus actuator 35 to drive the objective lens 33 in a direction perpendicular to the recording medium 1.

In accordance with embodiments of the present invention, a focus servo loop comprises the gain setting circuits 7, 8, the phase compensation circuits 13, 14, the seek/follow changeover circuit 18, the switch 21, the AF driver 23 and the focus actuator 35.

A sweep circuit 22 is connected to another terminal of the switch 21 to input a signal to the AF driver 23 to drive the objective lens 33 in the direction perpendicular to the recording medium 1. More particularly, the sweep circuit 22 inputs a signal to the AF driver 23 to perform a sweep operation such that the laser light spot scans all of the layers of the recording medium 1 in the focus direction during focus pulling during the rise time of the recording and playback device (i.e., when power to the device is turned on).

The optimum gains for the track error signal TE and the objective lens track position signal TP are respectively set by gain setting circuits 9, 10. The signals output from the gain setting circuits 9, 10 are input to a seek/follow changeover circuit 19 via phase compensation circuits 15, 16. The control signals output from the seek/follow changeover circuit 19 are input to an AT driver 24. The AT driver 24 supplies current to a tracking actuator 36 to drive the objective lens 33 in the radial direction of the recording medium 1.

In accordance with embodiments of the present invention, a tracking servo loop comprises the gain setting circuits 9, 10, the phase compensation circuits 15, 16, the seek/follow changeover circuit 19, the AT driver 24 and the tracking actuator 36.

The gain setting circuits 9, 10, and the phase compensation circuits 15, 16, are similar in operation to the gain setting circuits 7, 8 and the phase compensation circuits 13, 14, respectively.

Furthermore, the objective lens track position signal TP is set to an optimum gain by the gain setting circuit 11. The gain setting circuit 11 outputs a signal through a phase compensation circuit 17. The output from the phase compensation circuit 17, and the output of an in-surface/ between-layers seek circuit 26, described in more detail hereinafter, are input to a seek/follow changeover circuit 20. The control signal output from the seek/follow changeover circuit 20 is input to a carriage driver 25.

A drive current is supplied from the carriage driver 25 to a carriage (not shown) to drive the carriage in the radial direction of the recording medium thereby setting the position of the optical head 2 in the radial direction of the recording medium 1. In accordance with embodiments of the present invention, a carriage servo loop comprises the gain setting circuit 11, the phase compensation circuit 17, in-surface/between-layers seek changeover circuit 26, a standard speed circuit 27, the seek/follow changeover circuit 20, and the carriage driver 25.

In the above-described manner, the objective lens 33, the tracking actuator 36 and the carriage function as a tracking movement device.

The process of initializing the recording and playback device during the device rise time will now be described below. Initially, when an information recording medium 1 is loaded into the device interior, the CPU 28 of the information recording and playback device identifies that the recording medium 1 is a multi-layer recording medium having a plurality of recording layers. The identification that the recording medium 1 is a multi-layer recording medium is performed by reading a detection hole or bar code disposed on the cartridge of the recording medium 1, or by reading out information from an information area recorded in a first layer of the recording medium 1. In accordance with embodiments of the present invention, the recording layer 41 closest to the optical head 2 is referred to as the first recording layer. However, the recording layer 43 furthest from the optical head 2 may also be taken as the first recording layer.

A spindle motor 30 of the information recording and playback device rotates the recording medium 1, and the optical head 2 is moved by the carriage in the radial direction of the recording medium 1. The movement destination of the optical head 2 is position controlled at intermediate positions by a photointerrupter (not shown), or the like position detector, located at a predetermined position with respect to the mounting base of the carriage and spindle motor 30. The CPU 28 then controls an LD driver (not shown in the drawing) to drive the semiconductor laser 31 to emit light to generate a laser light spot to illuminate the recording medium surface via the objective lens 33.

At this time, the switch 21 selects the output of the sweep circuit 22 (focus servo in the OFF state), and the sweep circuit 22 provides a voltage value to the AF driver 23 according to a preset drive pattern. By providing voltage values to the AF driver 23, current is supplied to the focus actuator 35, and the objective lens 33 is driven to sweep in the direction perpendicular to the recording medium 1. FIGS. 2A–2D illustrate signal waveforms of the focus error signal FE and objection lens focus position signal LP obtained when the objective lens 33 sweeps in the direction perpendicular to the recording medium 1. More specifically, FIG. 2A illustrates a focus error signal curve FE obtained during sweep of the objective lens 33, having three S-shaped curves S1–S3 respectively corresponding to the three recording layers 41–43 of the recording medium 1. FIG. 2B illustrates the objective lens focus position signal LP obtained when the focus error signal FE shown in FIG. 2A is generated. FIG. 2C illustrates digital signals obtained when the focus error signal FE shown in FIG. 2A is digitized by comparison with a threshold value Ec.

An A/D converter 39 samples and holds the objective lens focus position signal LP at a timing corresponding to the digitized focus error signal FE shown in FIG. 2C, and converts the objection lens focus position signal LP to a digital value. In the above-described manner, the three values E1–E3 of the objective lens position signal LP can be obtained which respectively correspond to the three recording layers 41–43 of the recording medium 1. The values E1–E3 are stored in an EPROM 29 via the CPU 28.

Furthermore, by repeating the sweep of the objective lens 33 a plurality of times and acquiring a plurality of values for E1–E3, average values of the objective lens position signals may be obtained and stored.

Figure 3A:
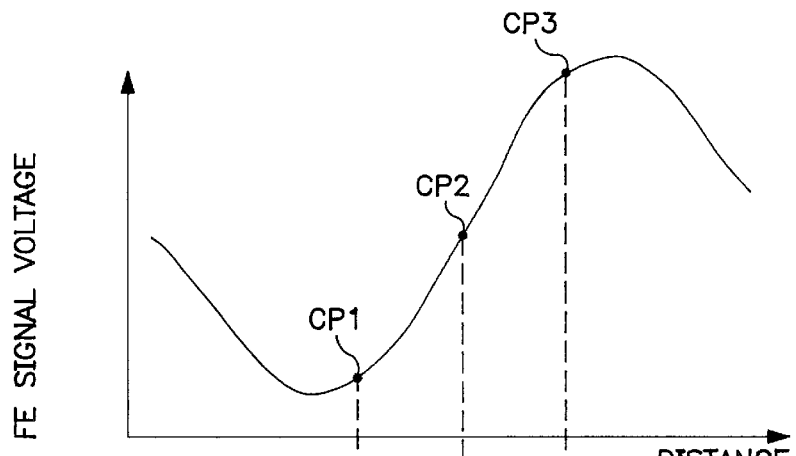
FIGS. 3A–3C are signal waveform diagrams of the focus error signal and the objective lens focus position signal in accordance with the first embodiment of the present invention.
Figure 3B:
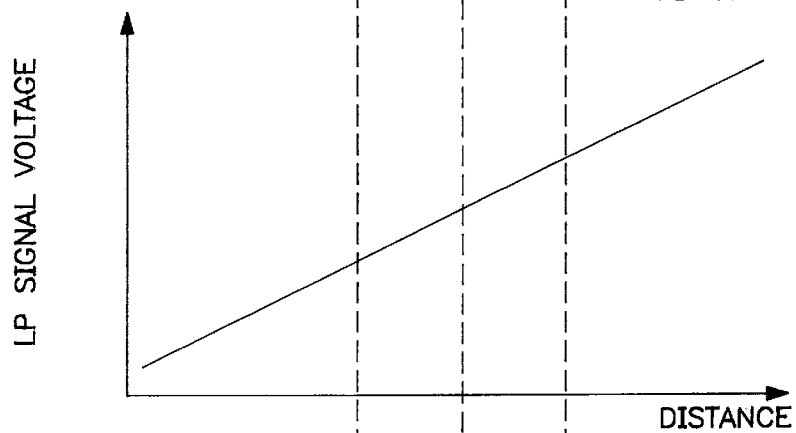
Figure 3C:
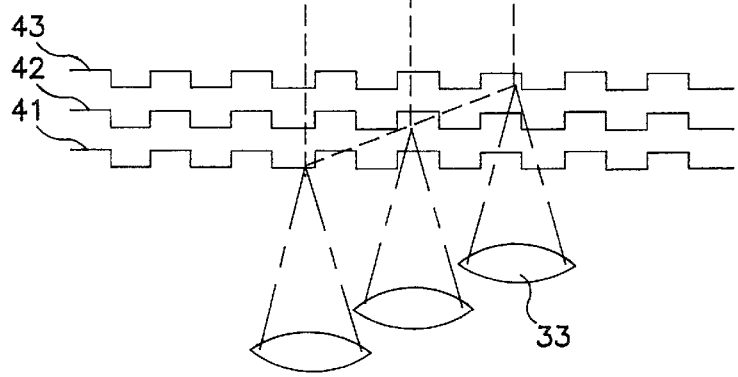

Moreover, as shown in FIG. 3A, according to the optical design conditions of the optical head 2, a focus error signal FE having one S-shaped curve can be obtained. The focus error signal FE shown in FIG. 3A cannot discriminate focus states of each recording layer. However, whether or not a focused state exists can be determined by detecting the amplitude of the track error signal TE or track crossing signal. More particularly, in a focused state, the track error signal TE becomes a maximum amplitude, and the track crossing signal becomes the amplitude center value.

Accordingly, the A/D converter circuit 39 samples and holds the objective lens position signal LP at a timing determined by the amplitude of the track error signal TE or the track crossing signal to obtain values similar to the three values E1–E3 of the objective lens position signal LP which respectively correspond to the three recording layers 41–43 of the recording medium 1.

Next, focus pulling to a predetermined layer of the recording medium 1 is performed. In accordance with the embodiments of the invention described herein, the predetermined layer is recording layer 41. The predetermined layer is a layer suited to the initialization of the servo or to the initialization of the recording and playback characteristics, or is a layer which is set previously for convenience. Since the recording layer 41 is the layer closest or furthest from the objective lens 33, control during focus pulling may be performed according to the first S-shaped curve S1 or the last S-shaped curve S3. Focus pulling for the first recording layer is similar to focus pulling for a normal single layer recording medium.

More particularly, while monitoring the level of the whole light amount signal, when focus is pulled close to the recording surface (i.e., close to the control point CP1 of the focus error signal FE shown in FIG. 2A), the state of the switch 21 is changed to set the focus servo in the ON state. More specifically, the state of the switch 21 is changed such that the output of the sweep circuit 22 is no longer input to the AF driver 23, and the output of the seek/follow changeover circuit 18 is now input to the AF driver 23. At this time, the seek/follow changeover circuit 18 is controlled by the CPU 28 to select the focus error signal FE from among the objective lens focus position signal LP from the phase compensation circuit 14 and the focus error signal FE from the phase compensation circuit 13, and outputs the selected focus error signal FE to the AF driver 23.

After the focus servo is set in the ON state, the seek/follow changeover circuit 19 is controlled by the CPU 28 to select the track error signal TE from among the track error signal TE from the phase compensation circuit 15 and the objective lens track position signal TP from the phase compensation circuit 16. The selected track error signal TE is output to the AT driver 24. In the above-described manner, the tracking servo is placed in the ON state.

Continuing, the seek/follow changeover circuit 20 is controlled by the CPU 28 to select the objective lens track position signal TP from among the objective lens track position signal TP from the phase compensation circuit 17 and the signal from the in-surface/between-layers seek changeover circuit 26. The seek/follow changeover circuit 20 outputs the track position signal TP to the carriage driver 25. In the above-described manner, the position of the objective lens 33 in the radial direction of the recording medium 1 is fed back to the carriage driver 25, and becomes a so-called double servo control.

When the above-described three following control states are complete, the laser spot is in a state which follows a track of the first recording layer 41. When the track of the first recording layer 41 is followed in the above-described manner, the A/D converter circuit 39 converts the objective lens focus position signal LP during one revolution of the recording medium 1 to a digital value. The ID address read out from the recording medium 1 may be used as a sampling trigger of the objective lens focus position signal LP. Further, an FG signal which regulates rotation control of the spindle motor 30 may also be used as the sampling trigger of the objective lens focus position signal LP.

The value acquired by the A/D converter circuit 39 is then stored in the EPROM 29 via the CPU 28. By acquiring the objective lens focus position signal LP for the rotation of the recording medium 1, it is possible to predict surface deviation changes accompanying the rotation of the recording medium 1. The initialization process of the device rise time is thus ended.

Furthermore, when a focus error signal FE having one S-shaped curve across the three recording layers 41–43 is obtained, as shown in FIG. 3A, because focus control is possible regardless of the recording layer and between recording layers, there is a possibility that the focus which is pulled is not on the surface of a recording layer. Therefore, after focus pulling, an offset value from the offset impressing circuit 12 is impressed on the focus error signal FE, while successively varying the offset value.

In the focused state, the A/D converting circuit 39 samples and holds the focus error signal FE at a timing determined by the amplitude of the track error signal TE or the track crossing signal to acquire a digital value V1 of the focus error signal FE because the track error signal TE becomes a maximum amplitude value or the track crossing signal becomes a central value at the time of the focus state. The value V1 is stored in the EPROM 29 via the CPU 28. By performing the above-described pulling of the focus error signal FE for each recording layer, values V1–V3 of the focus error signal FE can be stored which correspond to the recording layers 41–43, respectively.

Figure 4:
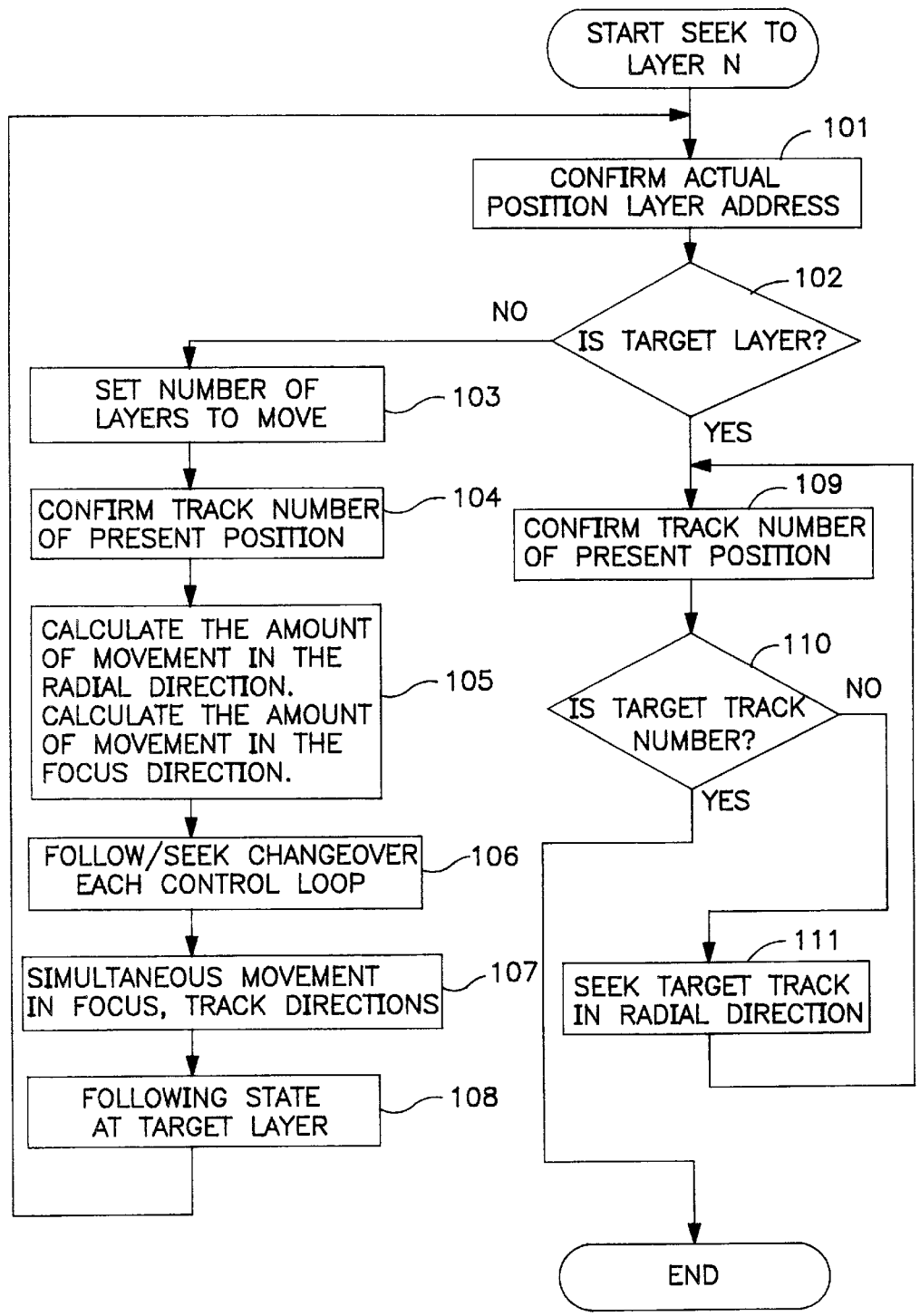
FIG. 4 is a flow chart of an operational process for performing a between-layers seek operation in accordance with the first embodiment of the present invention.

An operation of moving the focus position of the illumination beam between layers in the information recording medium 1 having a plurality of recording layers (i.e., a between-layers seek operation) will now be described with reference to FIGS. 4 and 5. FIG. 4 is a flow chart illustrating an operational process for performing the between-layers seek operation in accordance with the first embodiment of the invention. FIGS. 5A–5G are signal waveform diagrams describing the between-layers seek operation in accordance with the first embodiment of the invention. The between-layers seek operation will be described below using the example of moving from the recording layer 41 to the target recording layer 43. Further, the CPU 28 controls the operational process shown in FIG. 4.

Referring now to FIG. 4, firstly, in step 101, the CPU 28 identifies the recording layer presently being followed by the laser spot. The recording layer which is presently being followed is determined by reading out the ID address written on the recording medium 1. Next, it is determined whether or not the recording layer presently being followed is the target recording layer (step 102).

If the recording layer presently being followed is the recording layer 43, the determination in step 102 is affirmative, and the operational process proceeds to step 109. In step 109, the track which the laser spot is presently following is confirmed by the ID address. Continuing, in step 110, it is determined whether or not the track presently being followed is the target track. If the track being followed is not the target track, a seek is performed on the same surface in the radial direction only (step 111).

At this time, since the laser spot is following the recording layer 41 and the recording layer 43 is the target layer, the determination is step 102 is NO. The operational process then proceeds to step 103, and the CPU 28 sets a number of layers to move the focus position to reach the target layer. In accordance with the example described herein, the number of layers to move the focus position is two (2) layers because the between-layers seek is from recording layer 41 to recording layer 43. Continuing, in step 104, the CPU 28 confirms the track which the laser spot is presently following. Then, amount of movement of the laser spot in the radial direction of the recording medium 1 and in a direction perpendicular to the recording medium 1 (i.e., the focus direction) are calculated (step 105).

Next, in step 106, the CPU 28 sets the seek/follow signals applied to the seek/follow changeover circuits 18–20 to the "H" level, as shown in FIGS. 5C–5E, respectively, and at the same time changes the respective control loops from a following control state to a movement control state.

When the changeover signal shown in FIG. 5C changes to the "H" level, the seek/follow changeover circuit 18, which previously selected the focus error signal FE from the phase compensation circuit 13, selects the objective lens focus position signal LP from the phase compensation circuit 14 and outputs the objective lens focus position signal LP to the AF driver circuit 23. Moreover, when the changeover signal shown in FIG. 5C changes to the "H" level, when entering the between-layers seek operation, the offset impressing circuit 12 repeatedly impresses an offset value on the objective lens focus position signal LP output from the gain setting circuit 8, and varies the target value of the control successively from the E1 level of the recording layer 41 to the E3 level of the recording layer 43. Movement from the recording layer 41 to the recording layer 43 in the direction perpendicular to the recording medium 1 is performed in the above-described manner.

At the same time, when the signal shown in FIG. 5D changes to the "H" level, the seek/follow changeover circuit 19, which previously selected the track error signal TE from the phase compensation circuit 15, selects the objective lens track position signal TP and outputs the signal to the AT driver 24. In the above-described manner, the movement of the objective lens 33 relative to the radial direction of the recording medium 1 is fixed with respect to the carriage.

Next, when the signal shown in FIG. 5E changes to the "H" level, the seek/follow changeover circuit 20, which previously selected the objective lens track position signal TP from the phase compensation circuit 17, selects the output signal of the in-surface/between-layers seek changeover signal circuit 26, and outputs the signal to the carriage driver 25.

When the between-layers seek and the in-surface seek are performed at the same time, the in-surface/between-layers seek changeover circuit 26 detects a reverse voltage applied to the carriage driver 25. The reverse voltage represents the speed of the carriage. The in-surface/between-layers seek changeover circuit 26 then determines a difference between a standard speed signal output from the standard speed circuit 27 and the speed signal based on the above-described reverse voltage, and outputs the result to the seek/follow changeover circuit 20. At this time, the CPU 28 sets the speed of movement of the carriage from the previously calculated amount of movement in the radial direction of the recording medium 1, and causes a standard speed signal indicating the set speed of movement of the carriage to be output from the standard speed circuit 27.

Moreover, the in-surface/between-layers seek changeover circuit 26 continuously calculates the reverse voltage, which is the integral of the carriage movement speed, namely, the position. The CPU 28, assuming a present position in the radial direction of the recording medium 1, successively varies the standard speed according to the position information obtained by the in-surface/between-layers seek changeover circuit 26 (for example, reducing the speed when closer to a target position, etc.).

In the above-described manner, seeking between layers by moving the laser spot in a direction perpendicular to the recording medium 1, and an in-surface seek by moving the laser spot in the radial direction of the recording medium 1, are simultaneously performed (step 107).

Furthermore, in accordance with the first embodiment of the present invention, the reverse voltage of the carriage driver 25 is detected to calculate the position of the carriage.

However, the radial position of the carriage may be directly detected using a position detecting device such as a position sensor, linear encoder or the like. When a radial position of the carriage is directly detected using a position detecting device, since a position signal indicating the radial position of the carriage is obtained, the in-surface/between-layers seek changeover circuit 26 differentiates this position signal to determine a speed signal. The difference between the standard speed signal and the speed signal determined by differentiating the position signal is output by the in-surface/between-layers seek changeover circuit 26.

As shown in FIG. 5A, the focus error signal FE includes three S-shaped curves S1–S3 respectively corresponding to the three recording layers 41–43 of the recording medium 1. The number of recording layers can be determined by counting the number of S-shaped curves, as shown in the layer count signal of FIG. 5F. While the count of the number of S-shaped curves is performed, a waveform arising from chattering caused by disk rotation may result in an erroneous count. In order to prevent the erroneous count, the count of the S-shaped curves is performed only during the period that the S-shaped curves are expected to appear. The period that the S-shaped curves are expected to appear can be determined by detecting the distance between the objective lens 33 and the recording surface by the objective lens focus position sensor 5. Further, the period during which the S-shaped curves are expected to appear can be determined by detecting the timing of the appearance of tracking error signals TE, since the S-shaped curves of the focus error signal FE appear when the tracking error signal TE appears (see FIG. 5A and FIG. 5B).

When it is determined, by the count of the recording layer, that the target recording layer 43 has been reached the CPU 28 sets the level of the changeover signal shown in FIG. 5C to "L". In response to the changeover signal shown in FIG. 5C changing to the "L" level, the seek/follow changeover circuit 18 selects the focus error signal FE from the phase compensation circuit 13. Thus, the focus servo is changed from the movement control state to the following control state.

After the focus servo is set to the following control state, when the track pulling-in speed is less than a predetermined value, the CPU 28 sets the level of the changeover signal shown in FIG. 5E to "L". In response to the changeover signal shown in FIG. 5E changing to the "L" level, the seek/follow changeover circuit 20 selects the objective lens track position signal TP from the phase compensation circuit 17. Thus, the carriage servo changes from the movement control state to the following control state.

Continuing, the CPU 28 sets the level of the changeover signal shown in FIG. 5D to "L". In response to the changeover signal shown in FIG. 5D changing to the "L" level, the seek/follow changeover circuit 19 selects the track error signal TE from the phase compensation circuit 15. Thus, the tracking servo changes from the movement control state to the following control state.

When the above-described changes from the respective movement control states to the following control states are all complete, the laser spot is in a state of following the recording layer 43 (step 108).

Next, the operational process shown in FIG. 4 returns to step 101, and the ID address is read out to confirm a recording layer which the laser spot is presently following. Next, it is determined whether or not the recording layer the laser spot is presently following is the target layer (step 102). If the layer the laser spot is presently following is not the recording layer 43, a seek between layers is performed a second time.

If the layer which the laser spot is presently following is the target recording layer 43, then the determination in step 102 is affirmative. Next, the track which the laser spot is presently following is confirmed by the ID address (step 109) to determine whether or not the track being followed is the target track. If the track being followed is not the target track, seeking is performed on the same surface in the radial direction only (step 111).

When performing a seek on the same surface, the CPU 28 controls the focus servo to remain in the following control state, the seek/follow changeover circuit 19 selects the objective lens track position signal TP, the seek/follow changeover circuit 20 selects the output signal of the in-surface/between-layers seek changeover circuit 26, and the tracking servo and carriage servo are placed in the movement control state.

Furthermore, when performing a seek on the same surface, the in-surface/between layers changeover circuit 26 frequency-voltage converts the track error signal TE to obtain a speed signal indicating the speed of the carriage. A difference between the speed signal and the standard speed signal from the standard speed circuit 27 is determined, and the result is output in a manner similar to that described above. Moreover, the CPU 28 counts the track error signal TE to determine the present position in the radial direction of the recording medium 1, and successively varies the standard speed. Then, when it is determined that the target track has been reached, the CPU 28 returns the carriage servo and the tracking servo to the following control state. The between-layers seek and in-surface seek then end.

Second Embodiment of the Invention

Figure 6:
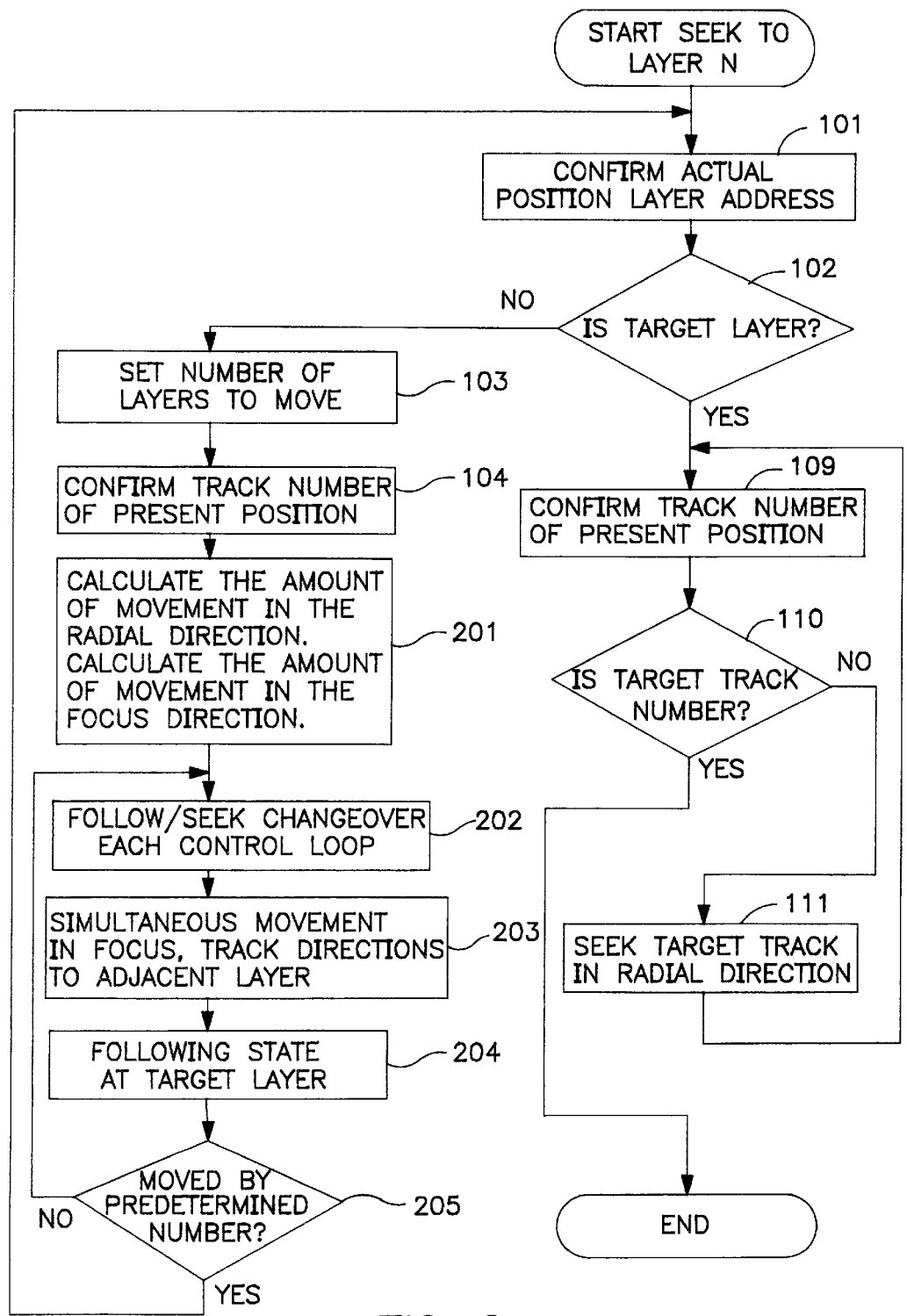
FIG. 6 is a flow chart of an operational process for performing a between-layers seek operation in accordance with a second embodiment of the present invention.

FIG. 6 is a flow chart illustrating an operational process for performing a between-layers seek operation in accordance with a second embodiment of the present invention. The operational process steps shown in FIG. 6 which are the same as those shown in FIG. 4 are referred to by the same reference elements, and a detailed description of these like steps will not be repeated here. FIGS. 7A–7G are signal waveform diagrams describing the between-layers seek operation in accordance with the second embodiment of the present invention.

In accordance with the second embodiment of the present invention, the information recording and playback device comprises components similar to those shown in FIG. 1 and described with respect to the first embodiment. Further, the between-layers seek, which is from recording layer 41 to recording layer 43, is also similar.

Firstly, as shown in FIG. 6, the operational process steps 101–104 and 109–111 are the same as steps 101–104 described with respect to the first embodiment of the invention. Following step 104, the operational process continues in step 201, and the CPU 28 calculates an amount of movement of the laser spot in the radial direction of the recording medium 1 and an amount of movement of the laser spot in the direction perpendicular to the recording medium 1. The amount of movement in the radial direction of the recording medium is determined in a manner similar to the first embodiment of the invention. However, since the movement to the target recording layer reiterates the between-layers seek to the adjacent recording layer, the movement distance in the direction perpendicular to the recording medium becomes the distance between the recording layers multiplied by the number of layers moved.

Next, in step 202, the CPU 28 sets the changeover signals to the "H" level, as shown in FIGS. 7C–7E and simultaneously changes each control loop from the following control state to the movement control state.

In response to the changeover signal shown in FIG. 7C changing to the "H" level, the seek/follow changeover circuit 18 selects the objective lens focus position signal LP from the phase compensation circuit 14. The offset impressing circuit 12 then repetitively impresses an offset value on the objective lens focus position signal LP output from the gain setting circuit 8, and successively changes the control target value from the E1 level of the recording layer 41 to the E2 level of the recording layer 42.

The seek/follow changeover circuits 19, 20, the in-surface/between layers seek changeover circuit 26, the standard speed circuit 27, and the in-surface seek by the carriage radial position sensor, are similar to those described with respect to the first embodiment of the invention.

In the above-described manner, a between-layers seek to move the laser spot to an adjacent recording layer, and an in-surface seek to move the laser spot in the radial direction of the recording medium 1 are simultaneously performed (step 203).

The CPU 28 sets the changeover signal shown in FIG. 7C to the "L" level in accordance with the recording layer count which counts the number of S-shaped curves, as illustrated by the layer count signal shown in FIG. 7F. In response to the changeover signal shown in FIG. 7C changing to the "L" level, the seek/follow changeover circuit 18 selects the focus error signal FE from the phase compensation circuit 13. Thus, the focus servo changes from a movement control state to a following control state.

After the focus control servo has been placed in the following control state, when the track pulling-in speed becomes less than a predetermined value, the CPU 28 sets the changeover signal shown in FIG. 7E to the "L" level. In response to the changeover signal shown in FIG. 7E changing to the "L" level, the seek/follow changeover circuit 20 selects the objective lens track position signal TP from the phase compensation circuit 17. Thus, the carriage servo is changed from a movement control state to a following control state.

Continuing, the CPU 28 sets the changeover signal shown in FIG. 7D to the "L" level. In response to changeover signal shown in FIG. 7D being changed to the "L" level, the seek/follow changeover circuit 19 selects the track error signal TE from the phase compensation circuit 15. Thus, the tracking servo is changed from a movement control state to a following control state. After completion of changing the movement control states to following control states, the laser spot in a state following the recording layer 42 (step 204).

Next, in step 205, the CPU 28 determines whether or not the between-layers seek has been performed to the extent of the movement layer number. In accordance with the second embodiment of the invention, the number of movement layers is two (2). Therefore, since one (1) between-layers seek was performed from recording layer 41 to recording layer 42, a between-layers seek from recording layer 42 to recording layer 43 is then performed similarly to the above-described steps 202–204. The operational process steps 101, 102, and 109–111 after the laser spot has been moved to the recording layer 43 are similar to those described with respect to the first embodiment of the invention.

In accordance with the second embodiment of the invention, the between-layers seek and the in-surface seek reiterate according to the number recording layers the laser spot is moved. Accordingly, the speed of movement is decreased in comparison with the first embodiment of the invention, but stabilized movement between layers can be realized.

Third Embodiment of the Invention

Figure 8:
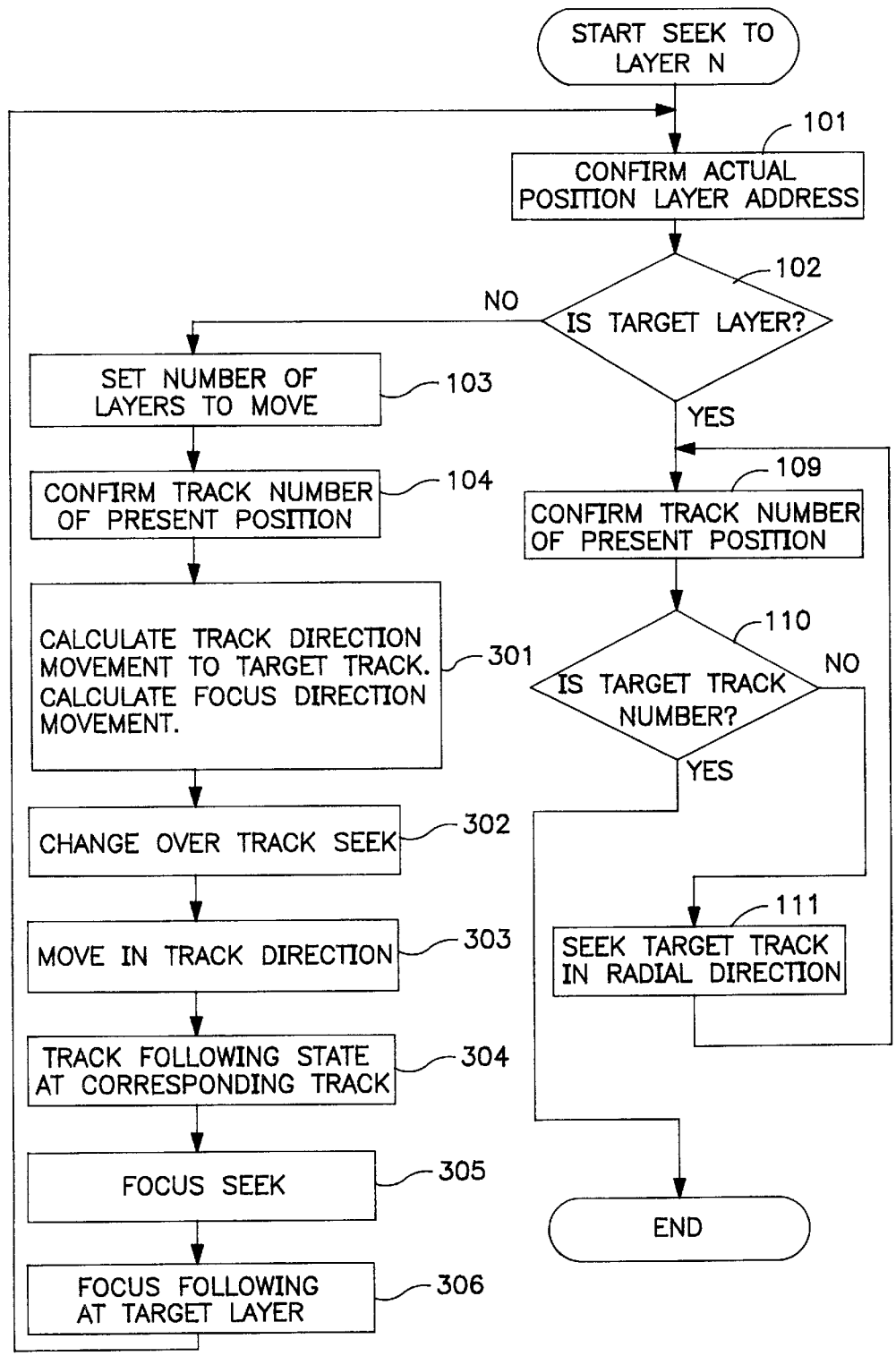
FIG. 8 is a flow chart of an operational process for performing a between-layers seek operation in accordance with a third embodiment of the present invention.

FIG. 8 is a flow chart illustrating an operational process for performing a between-layers seek operation in accordance with a third embodiment of the present invention. FIGS. 9A–9G are signal waveform diagrams describing the between-layers seek operation in accordance with the third embodiment of the present invention. The steps and elements shown in FIGS. 8 and 9 which are the same as or similar to those shown in FIGS. 4 and 5 are referred to by like reference numerals, and a detailed description of these like steps and elements will not be repeated here. The third embodiment of the present invention will be described below with respect to performing a seek operation from the recording layer 41 to the recording layer 42.

As shown in FIG. 8, firstly, the operational process steps 101–104 are similar to those described with respect to the first embodiment of the invention. Furthermore, since the between-layers seek is from the recording layer 41 to the recording layer 42, the number of layers moved is set to one (1) in step 103.

After step 104 is performed, the operational process continues in step 301, and the CPU 28 calculates an amount of movement of the laser spot in the radial direction of the recording medium 1 and in the direction perpendicular to the recording medium 1. The amount of movement in the radial direction of the recording medium 1 determined in a manner is similar to the first embodiment of the present invention. However, in accordance with the third embodiment of the invention, since the seek on the same surface is performed first, an address change is required which is less than the movement amount in the present layer with respect to the radial direction of the recording medium 1.

More particularly, the CPU 28 determines the radial position of the recording medium 1 from the track address which is the target of the recording layer 42, and changes the target to the track address on the recording layer 41 having a radial position which is about the same. The address change from the recording layer 42 to the recording layer 41 and the radial position corresponding to the track address can be realized by referring to a table stored in the EPROM 29.

Figure 9A:
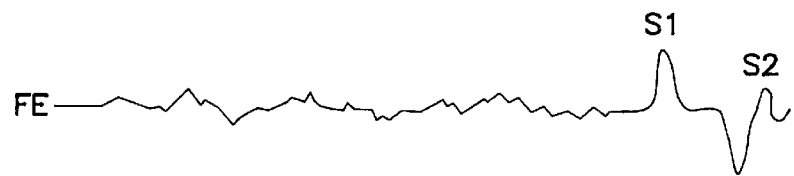
FIGS. 9A–9G are signal waveform diagrams describing a between-layers seek operation in accordance with the third embodiment of the present invention.
Figure 9B:
Figure 9C:

Next, the CPU 28 keeps the focus servo unchanged in the following control state (changeover signal of FIG. 9C is "L"), and sets the changeover signals shown in FIGS. 9D and 9E to the "H" level, to simultaneously change the tracking servo and the carriage servo from the following control state to the movement control state (step 302), and moves the laser spot to the track on the recording layer 41 previously determined (step 303).

In accordance with the third embodiment of the invention, when performing the seek on the same surface in a radial direction only, the operation of the seek/follow changeover circuits 19, 20, the in-surface/between layers seek changeover circuit 26, the standard speed circuit 27, and the carriage radial direction sensor are all similar to those described with respect to the first embodiment of the invention.

Figure 9D:
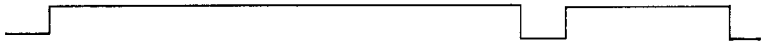
Figure 9E:
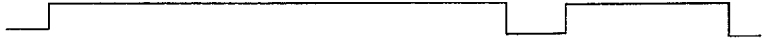

After the seek operation ends, the CPU 28 sets the changeover signal shown in FIG. 9E to the "L" level. In response to the changeover signal shown in FIG. 9D changing to the "L" level, and the seek/follow changeover circuit 20 selects the objective lens track position signal TP from the phase compensation circuit 17. Thus, the carriage servo is changed from the movement control state to the following control state.

Continuing, the CPU 28 sets the changeover signal shown in FIG. 9D to the "L" level. In response to the changeover signal shown in FIG. 9D changing to the "L" level, the seek/follow changeover circuit 19 selects the track error signal TE from the phase compensation circuit 15. Thus, the tracking servo is changed from the movement control state to the following control state. As a result, the laser spot is placed in a state which follows the track on the recording layer 41 having about the same radial position as the track which is the target track on the recording layer 42 (step 304).

Next, the CPU 28 sets the respective changeover signals to the "H" level, and applies the changeover signals to the seek/follow changeover circuits 18–20, simultaneously changing each control loop to the movement control state from the following control state (step 305). In response to the changeover signals changing to the "H" level, the seek/follow changeover circuit 18 selects the objective lens focus position signal LP from the phase compensation circuit 14. Further, the offset impressing circuit 12 repeatedly impresses an offset value on the objective lens focus position signal LP output from the gain setting circuit 8, and successively varies the target value of the control from the level E1 of the recording layer 41 to the level E2 of the recording layer 42. In the above-described manner, movement of the light spot from the recording layer 41 to the recording layer 42 is performed in a direction perpendicular to the recording medium 1.

The seek/follow changeover circuit 19 then selects the objective lens track position signal TP from the phase compensation circuit 16, and the seek/follow changeover circuit 20 selects the output signal of the in-surface/between-layers seek changeover circuit 26. The operation of the in-surface/between-layers seek changeover circuit 26 when simultaneously performing between-layers seek and in-surface seek is similar to the first embodiment of the invention. However, in contrast to the first embodiment, the CPU 28 causes a standard speed signal having a zero carriage movement speed to be output from the standard speed circuit 27.

Furthermore, since the laser spot is moved between layers and the track error signal TE disappears, although only a between-layers seek is performed, the tracking servo and the carriage servo in the movement control state, because the carriage, when put into the unchanged following control state, becomes in an indefinite state.

Figure 9F:
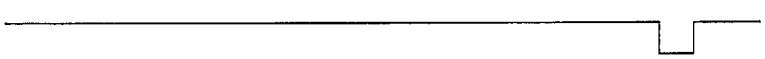
Figure 9G:
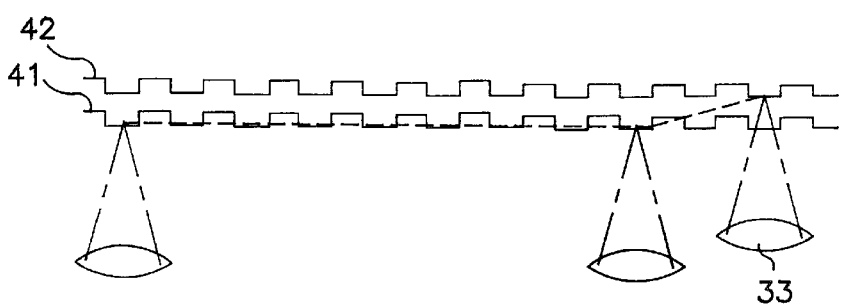

When it is determined, by counting the number of S-shaped curves, that the recording layer count has reached the recording layer 42, as shown by a layer count signal in FIG. 9F, the CPU 28 sets the changeover signal of FIG. 9C to the "L" level. In response to the changeover signal shown in FIG. 9C changing to the "L" level, the seek/follow changeover circuit 18 selects the focus error signal FE, and the focus servo changes from the movement control state to the following control state.

After the focus servo is set in the following control state, when the track pulling-in speed becomes less than a predetermined value, the CPU 28 sets the changeover signal shown in FIG. 9E to the "L" level. In response to the changeover signal shown in FIG. 9E changing to the "L" level, the seek/follow changeover circuit 20 selects the objective lens track position signal TP, and the carriage servo changes from the movement control state to the following control state.

Continuing, the CPU 28 sets the changeover signal shown in FIG. 9D to the "L" level. 9D. In response to the changeover signal shown in FIG. 9D changing to the "L" level, the seek/follow changeover circuit 19 selects the track error signal TE, and the tracking servo changes from the movement control state to the following control state.

When the control states described above have all been changed from the movement control state to the following control state, the laser spot is in a state which follows the recording layer 42 (step 306). After the laser spot has been moved to the recording layer 42, the operational process steps 101, 102, and 109–111, are similar to those described above with respect to the first embodiment of the invention.

In accordance with the above-described embodiments of the present invention, counting of the S-shaped curves is performed as a count of the recording layers in the between-layers seek operation. However, when a focus error signal FE is obtained having one (1) S-shaped curve across the recording layers 41–43, the count of the recording layers may be performed as described below, with reference to the signal waveform shown in FIGS. 10A–10G. The changeover signals shown in FIGS. 10C, 10D, and 10E are similar to those shown in FIGS. 5C–5E, respectively.

When a focus error signal FE is obtained, as shown by the full line in FIG. 10A, the S-shaped curves cannot be counted. In this case, when the amplitude level of the track error signal TE, shown in FIG. 10B, exceeds a predetermined value, it is determined that a recording layer has been reached. By counting the number of times the track error signal shown in FIG. 10B exceeds the predetermined value, the number of layers can be counted, as shown by the layer count signal of FIG. 10F. Moreover, the number of layers may also be counted according to the values V1–V3 of the focus error signal FE corresponding respectively to the recording layers 41–43.

Moreover, in accordance with the above-described embodiments of the present invention, when the seek/follow changeover circuit 18 selects the objective lens focus position signal LP and an offset value is impressed on the objective lens focus position signal LP from the offset impressing circuit 12, the focus control device is in the between-layers seek state. However, it is also possible to seek between layers when a focus error signal FE having one (1) S-shaped curve across the recording layers 41–43 is generated, without using the feedback of the objective lens focus position signal LP. More particularly, the focus error signal FE which has been selected can be used to seek between layers by adding an offset from the offset impressing circuit 12 to the focus error signal FE.

Fourth Embodiment of the Invention

Figure 11:
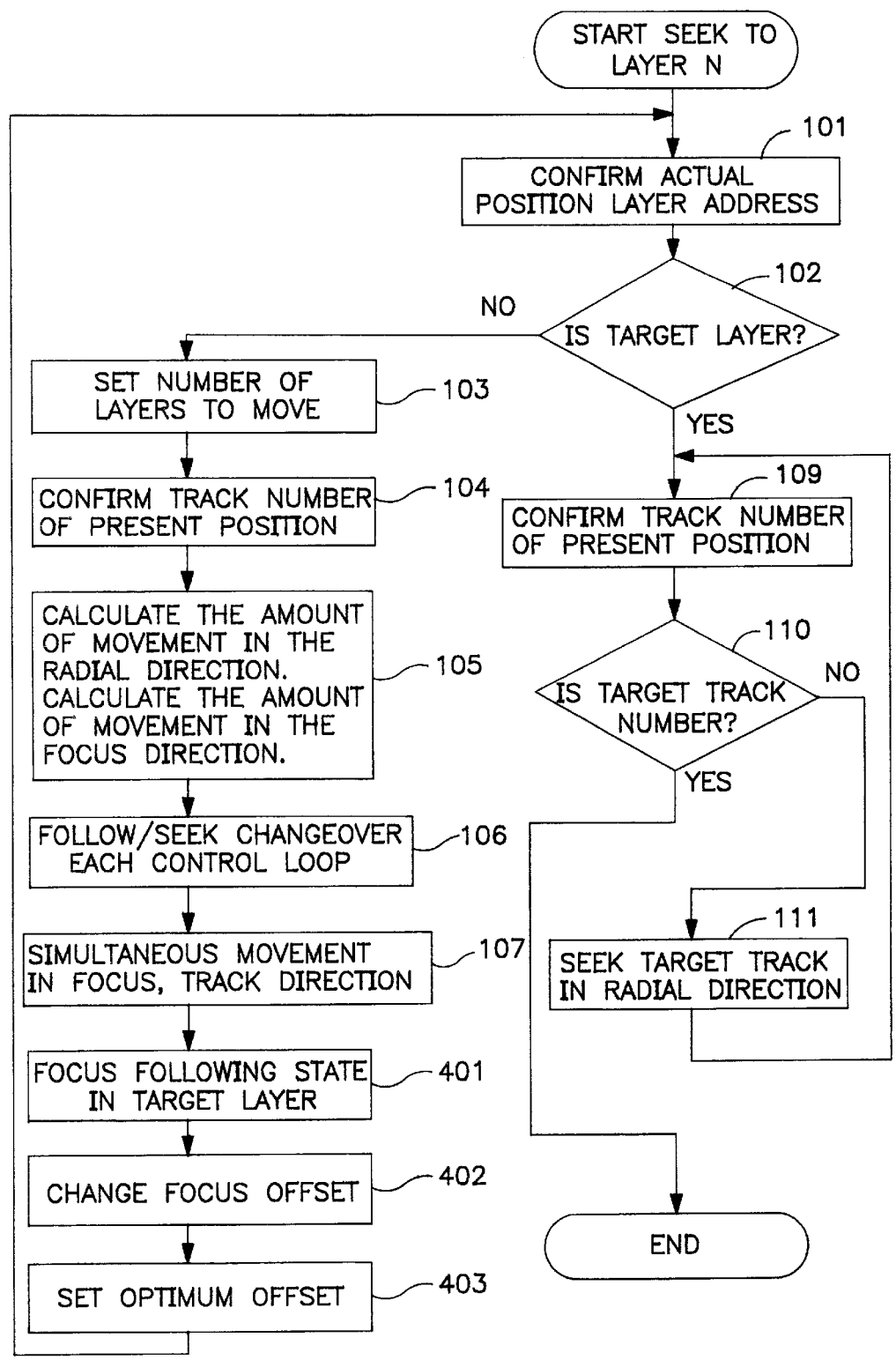
FIG. 11 is a flow chart of an operational process for performing a between-layers seek operation in accordance with embodiments of the present invention.

FIG. 11 is a flow chart of an operational process for performing a between-layers seek operation in accordance with a fourth embodiment of the present invention. FIGS. 12A–12G are signal waveform diagrams describing the between-layers seek operation in accordance with the fourth embodiment of the invention. Steps and elements shown in FIGS. 11 and 12 which are the same as those shown in FIGS. 4 and 5 are referred to by like reference numerals, and a detailed description of these like steps and elements will not be repeated here. In accordance with the fourth embodiment of the invention, a between-layers seek is performed from recording layer 41 to the recording layer 42.

Figure 12A:
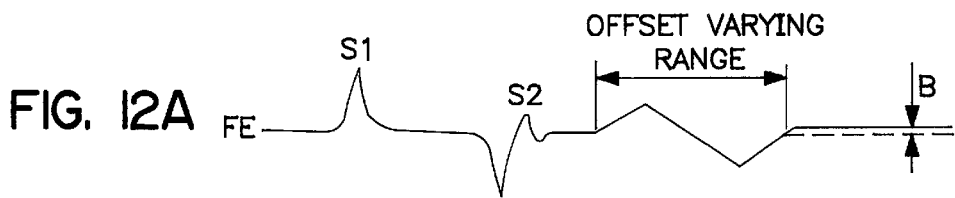
FIGS. 12A–12G are signal waveform diagrams describing a between-layers seek operation in accordance with a fourth embodiment of the present invention.
Figure 12B:
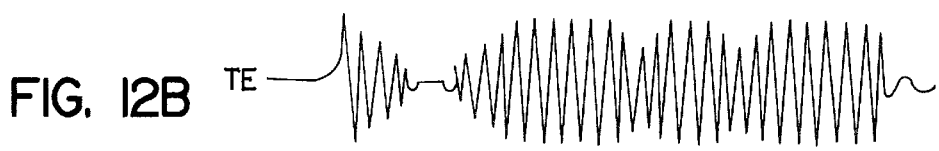
Figure 12C:
Figure 12D:
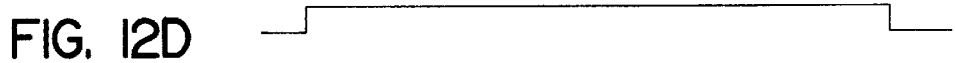
Figure 12E:
Figure 12F:
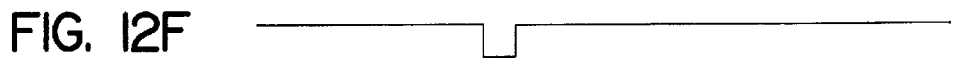
Figure 12G:
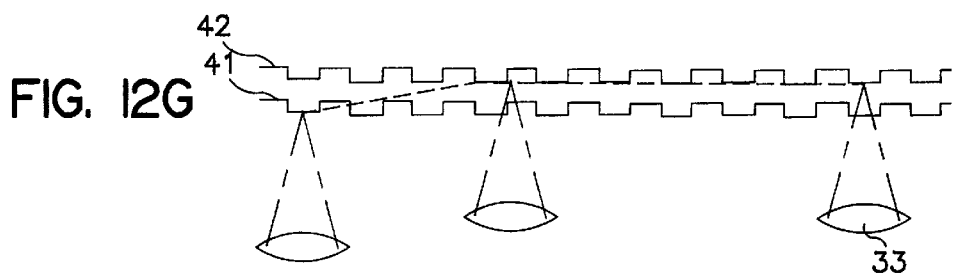

Firstly, the operational process steps 101–107 and 109–111 are similar to those described with respect to the first embodiment of the invention. After step 107, the CPU 28 outputs instruction signals to the offset impressing circuit 12 according to the timing which is completed by the focus following to the target recording layer 42 (step 401), and an offset value is impressed, as shown in FIG. 12A, on the focus error signal FE which has been output from the gain setting circuit 7 (step 402).

The A/D converting circuit 39 then acquires the track error signal TE via a peak hold circuit (not shown in the drawing). When an offset value sweeps for one (1) period, as shown in FIG. 12A, the amplitude of the track error signal TE (FIG. 12B) changes accompanying the sweep of the offset value, and the maximum amplitude value of the track error signal TE is acquired by the A/D converting circuit 39.

The offset value provided to the maximum amplitude value of the track error signal TE is the optimum offset value which realizes the optimum focus state to the recording layer 42. In this manner, the optimum offset value relating to the recording layer 42 can be set, and the optimum offset value is stored in the EPROM 29 via the CPU 28. The setting of the offset value which has been determined is performed by the focus servo in the state of following control by impressing on the focus error signal FE the optimum offset value B (FIG. 12A) from the offset impressing circuit 12.

Consequently, if the setting of such a variable offset value and optimum offset value is performed according to the recording layer, the focus offset value, which is added to the focus error signal FE in the following control state, can be set to the optimum value according to each recording layer.

Furthermore, the optimum offset value may also be determined by detecting the track crossing signal in the absence of a track error signal TE since, at the time of a track crossing signal, the amplitude center value is obtained when there is a focused state.

Furthermore, in accordance the fourth embodiment of the present invention, the optimum offset is found by the between-layers seek after having reached the recording layer which is the target layer. However, the optimum offset may also be determined in the middle of the initialization process.

Furthermore, in accordance embodiments of the invention, the ID detection circuit 4, the gain setting circuits 7–11, the offset impressing circuit 12, the phase compensation circuits 7–11, the seek/follow changeover circuits 18–20, the sweep circuit 22, the in-surface/between-layers 20 seek changeover circuit 26, the standard speed circuit 27, the CPU 28, and the like may be functionally embodied by hard wiring using a digital signal processor (DSP).

In accordance with the embodiments of the invention described hereinabove, focus control can be performed in each recording layer of an information recording medium having a plurality of recording layers. As a result, an information recording and playback medium can be realized which has a high capacity and which can record and play back at high speed.

Moreover, in accordance with embodiments of the present invention, when an in-surface seek in the same recording layer is performed, speed control and position control are performed based on the track error signal. Further, when performing an in-surface seek at the same time as a between-layers seek, by performing speed control and position control based on the drive signal of the tracking movement device or performing speed control and position control based on the position signal, movement control of the tracking movement device can easily be performed.

Moreover, in accordance with embodiments of the present invention, optimum focus control can be obtained for each of a plurality of recording layers by changing the focus offset value which is added to the focus error signal in the following control state to an optimum value according to each recording layer.

Moreover, in accordance with embodiments of the present invention, by setting the focus offset by an initialization process during the device rise time, or by setting the optimum focus offset value by varying the timing according to the seek end, the optimum offset value can easily be set.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A focus control device, comprising:

an illuminating device to illuminate an information recording medium having a plurality of recording layers with a converged light beam;

a focusing device to set a focus position of the converged light beam in a direction perpendicular to the recording medium surface;

a tracking device to set an illumination position of the converged light beam in a radial direction on the recording medium; and a control unit to perform a seek operation to move the illumination position of the light beam to a target track of a target recording layer, wherein the control unit controls the focusing device and the tracking device to change from a track following control state to a movement control state in which the illumination position of the light beam is moved in the radial direction of the medium while the focus position of the light beam is moved in the direction perpendicular to the medium, and to return to a track following control state when the illumination position of the light beam is in a neighborhood of the target track of the target recording layer.

2. A focus control device as recited in claim 1, further comprising:

a track error signal forming device to form a track error signal based on a relative displacement of the illumination position of the light beam and the track position of the medium in the radial direction of the medium, wherein the control unit performs speed control and position control of the tracking device based on the track error signal when moving the illumination position of the light beam to another track of the same recording layer.

3. A focus control device as recited in claim 1, further comprising:

a position signal forming device to form a position signal based on the displacement of the tracking device in the radial direction of the medium, wherein the control unit performs speed control and position control of the tracking device based on the position signal, or performs speed control and position control of the tracking device based on a signal to drive the tracking device, when moving the illumination position of the light beam to another track of a different recording layer.

4. A focus control device as recited in claim 1, further comprising:

a focus error signal forming device to form a focus error signal based on a relative displacement of the illumination position of the light beam and the medium surface in the radial direction of the medium, wherein the control device controls the focusing device based on the focus error signal, and changes a focus offset value added to the focus error signal in the track following control state according to each recording layer.

5. A focus control device as recited in claim 4, wherein the control unit sets the focus offset value by an initialization process during the device rise time.

6. A focus control device as recited in claim 4, wherein the control unit changes the focus offset value at an end of an operation to move the light beam to the target position.

* * * * *